(12) United States Patent
Hikmet et al.

(10) Patent No.: US 11,828,438 B2
(45) Date of Patent: Nov. 28, 2023

(54) PRINTING STRUCTURES WITH OPENINGS IN A SIDE SURFACE

(71) Applicant: SIGNIFY HOLDING B.V., Eindhoven (NL)

(72) Inventors: Rifat Ata Mustafa Hikmet, Eindhoven (NL); Jacobus Petrus Johannes Van Os, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 132 days.

(21) Appl. No.: 17/625,019

(22) PCT Filed: Jul. 1, 2020

(86) PCT No.: PCT/EP2020/068450
§ 371 (c)(1),
(2) Date: Jan. 5, 2022

(87) PCT Pub. No.: WO2021/004843
PCT Pub. Date: Jan. 14, 2021

(65) Prior Publication Data
US 2022/0290837 A1    Sep. 15, 2022

(30) Foreign Application Priority Data

Jul. 9, 2019  (EP) ..................................... 19185200

(51) Int. Cl.
*B33Y 10/00* (2015.01)
*F21V 1/00* (2006.01)
(Continued)

(52) U.S. Cl.
CPC ................ *F21V 1/00* (2013.01); *B33Y 30/00* (2014.12); *B33Y 80/00* (2014.12); *F21V 15/01* (2013.01)

(58) Field of Classification Search
CPC ............ F21V 1/00; F21V 15/01; B33Y 30/00; B33Y 80/00; B33Y 10/00; B33Y 50/02;
(Continued)

(56) References Cited

U.S. PATENT DOCUMENTS

2011/0070394 A1    3/2011  Hopkins et al.
2014/0252684 A1*   9/2014  Swanson ............... B29C 64/393
                                                              264/401
(Continued)

FOREIGN PATENT DOCUMENTS

WO    2017040893 A1    3/2017
WO    2019092217 A1    5/2019

OTHER PUBLICATIONS

Theimperialdonut: "Why is Cura generating partial top layers?", May 28, 2017, XP055658043, https://community.ultimaker.com/18303-why-is-cura-generating-partial-top-layers/.

*Primary Examiner* — Donald L Raleigh

(57) ABSTRACT

A method for producing a 3D item (1) by means of fused deposition modelling, the method comprising a 3D printing stage comprising layer-wise depositing an extrudate (321) comprising 3D printable material (201), to provide the 3D item (1) comprising 3D printed material (202), wherein the 3D item (1) comprises a plurality of layers (322) of 3D printed material (202), and an opening (405) in the 3D printed material (202), the opening (405) having an opening edge (410) that is at least partly defined by one or more interruptions (1410) in a subset (1322) of one or more layers (322) of the plurality of layers (322), wherein the method comprises providing each interruption (1410) by 3D printing a layer (322) of the subset (1322) with oppositely arranged turns (415), wherein each turn (415) connects a first layer part (3221) and a second layer part (3222), the first layer part (3221) and the second layer part (3222) forming legs of a U-turn (435), wherein, for each turn (415), the first layer part
(Continued)

(3221) has a first length (LI) and the second layer part (3222) has a second length (L2), the second length (L2) being shorter than the first length (LI) such that over only part of the layer (322) the first layer part (3221) and the second layer part (3222) are configured adjacent, and wherein each turn (415) has a path length (Lr) with a radius of curvature (r1), and wherein each path length (Lr) is selected from the range of $0.9*7c*r1 < Lr \leq 7r*r1$.

5 Claims, 10 Drawing Sheets

(51) Int. Cl.
 *B33Y 30/00* (2015.01)
 *B33Y 80/00* (2015.01)
 *F21V 15/01* (2006.01)
(58) Field of Classification Search
 CPC .. G05B 19/4099; B29C 64/393; B29C 64/118
 See application file for complete search history.

(56) References Cited

U.S. PATENT DOCUMENTS

| | | |
|---|---|---|
| 2015/0040428 A1 | 2/2015 | Davis et al. |
| 2016/0257033 A1 | 9/2016 | Jayanti et al. |
| 2017/0120532 A1 | 5/2017 | Kozlak et al. |
| 2018/0050486 A1 | 2/2018 | Talgorn et al. |

\* cited by examiner

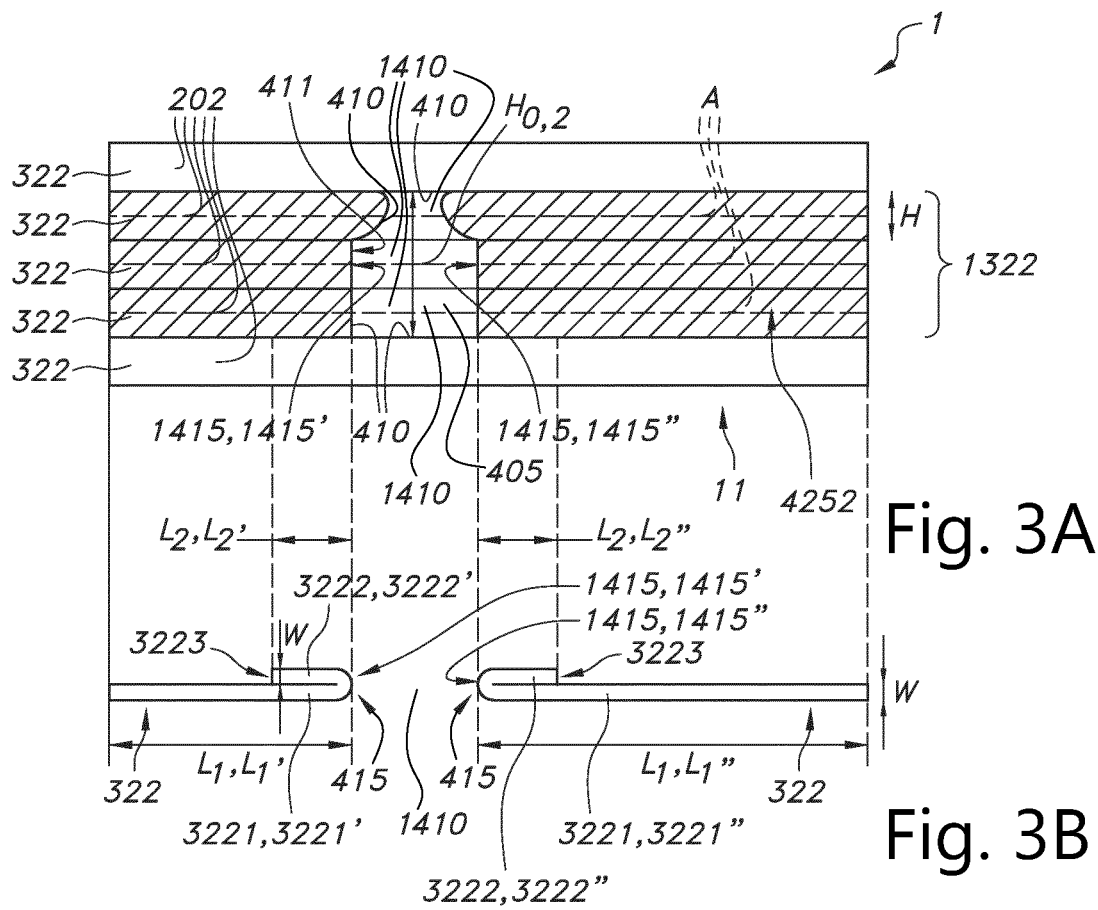
Fig. 3A
Fig. 3B
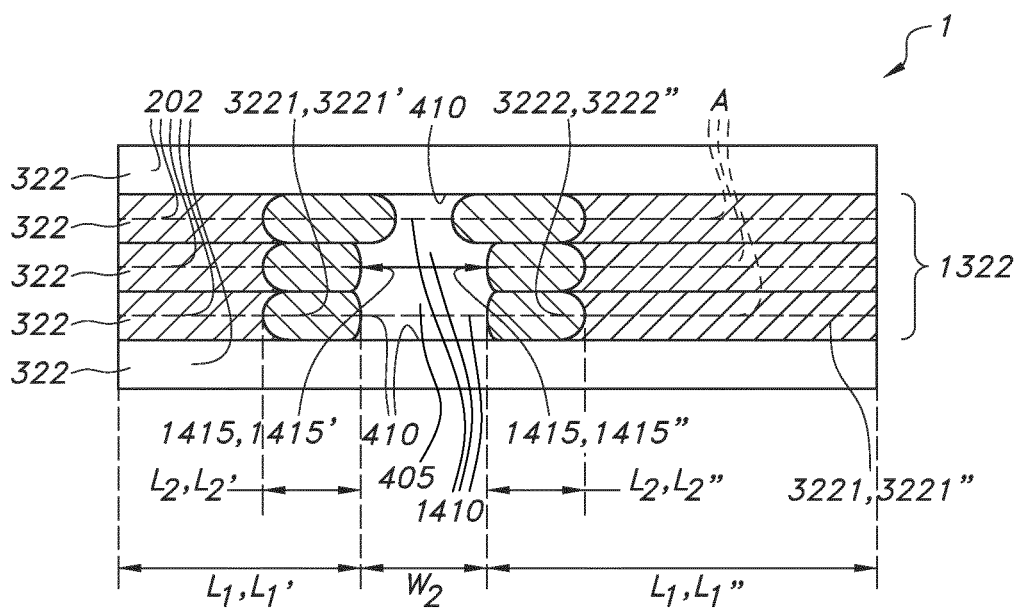
Fig. 3C

PRINTING STRUCTURES WITH OPENINGS IN A SIDE SURFACE

CROSS-REFERENCE TO PRIOR APPLICATIONS

This application is the U.S. National Phase application under 35 U.S.C. § 371 of International Application No. PCT/EP2020/068450, filed on Jul. 1, 2020, which claims the benefit of European Patent Application No. 19185200.3, filed on Jul. 9, 2019. These applications are hereby incorporated by reference herein.

FIELD OF THE INVENTION

The invention relates to a method for manufacturing a 3D (printed) item and to a software product for executing such method. The invention also relates to the 3D (printed) item obtainable with such method. Further, the invention relates to a lighting device including such 3D (printed) item.

BACKGROUND OF THE INVENTION

Three-dimensional parts printed using additive manufacturing techniques are known in the art. US2016/0257033, for instance, describes a three-dimensional part which is printed using an additive manufacturing technique and which part includes an outer wall having an outer surface defining a shape of a part and in interior surface defining an interior cavity. The part includes a plurality of first sections having a plurality of printed layers, each printed layer of the first section having a plurality of wall segments that form triangle shaped cells wherein each of the plurality of first sections are attached to the interior surface of the outer wall. The part includes a plurality of second sections having a plurality of printed layers, each printed layer of the second section having a plurality of wall segments that form hexagram shaped cells of hexagons and triangles, wherein each of the plurality of second printed sections are attached to the interior surface of the outer wall and wherein the first and second sections are in an alternating pattern, wherein when adjacent printed layers of the first and second sections are printed a wall segment of a cell defining a triangle bisect the hexagon shaped cell.

A method for producing a 3D item by means of fused deposition modelling is described in a post of May 28, 2017 on Ultimaker's online community of 3D printing experts (see https://community.ultimaker.com/topic/18303-why-is-cura-generating-partial-top-layers/). In this post, it is mentioned that, instead of a continuous layer, Ultimaker's 3D-printing slicer software Cura in certain circumstances creates a partial top layer, being a layer with openings in between subsequent segments of the layer.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

It may be desirable to create 3D items with one or more holes ("openings"), such as walls with an opening. For instance, it may be useful to create a hollow 3D item of which an inner cavity or open space may be reached via an opening in a 3D printed wall. Creating such openings with a 3D printing process may either in a solution lead to less well-defined openings, as the nozzle stops at an opening edge, or in another solution it may lead to thicker walls, such as e.g. comprising two or more layers. In the latter line of solution, any additional opening in a wall may lead to an increase in the thickness of the walls (see also below).

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Hence, in an aspect the invention provides a method for producing a 3D item ("item" or "3D printed item"), especially by means of fused deposition modelling. The method comprises a 3D printing stage comprising layer-wise depositing an extrudate comprising 3D printable material, to provide the 3D item comprising 3D printed material (on a receiver item). Especially, the 3D item comprises a one or more layers, especially a plurality of layers of 3D printed material, wherein the 3D item comprises an opening in the 3D printed material. Especially, the opening in the 3D printed material is at least partly defined by one or more interruptions in a subset of one or more ((respective)) layers of the plurality of layers. Especially, the opening is defined by an opening edge. Further, in embodiments the one or more interruptions in each of the one or more layers of the subset are provided by 3D printing each of the one or more layers of the subset with oppositely arranged turns. Especially, the (respective) turns connect (respective) layer parts. Hence, the (respective) turns each connect a first layer part and a second layer part (at opposite sides of the opening). Or, in other words the first layer part and the second layer part may change in one another via the turn.

The (respective) turns connect (respective) layer parts whereby they form legs of the (respective) turns. The (respective) layer parts are configured adjacent. Further, especially for the (respective) U-turns, a (respective) second layer part (having a second length (L2)) is shorter than a (respective) first layer part (having a first length (L1) (which may especially be the length between openings) such that over only part of the (respective) layer, the (respective) layer parts are configured adjacent.

Alternatively or additionally, in embodiments there is at least one ((respective)) set of tangentials to the (respective) layer parts connected to a (respective) turn that have a mutual angle (θ) equal to or smaller than 90°, especially smaller than 90°.

The turns comprise U-turns. One or both of oppositely arranged turns, especially both of the oppositely arranged turns, may comprise U-turns. In such embodiments, the mutual angle (θ) (of the respective set of tangentials) is 0°.

The (respective) turns each connect a first layer part and a second layer part, wherein each turn has a path length (Lr) with a radius of curvature (r1), and wherein each path length (Lr) is selected from the range of $0.9*\pi*r1 \leq Lr \leq \pi*r1$.

In an aspect, which may identical to one or more embodiments within the scope of the aforementioned embodiments and/or aspects, or may at least partially overlap, the invention provides (also) a method for producing a 3D item by means of fused deposition modelling, wherein the 3D item comprises a layer stack having an opening with an opening edge, one or more layers of the layer stack having first and second regions at opposite sides of the opening edge, wherein the method comprises the step of moving a printer head along a tool path having a tool path length to deposited each of the one or more layers, wherein the tool path has a first turn to form the first region and a second turn to form the second region, wherein each of the first and second turns has an angle θ2 of at least 90°, such as larger than 90°, like at least about 120°, such as in embodiments 180°. Especially, in embodiments part of the tool path between the first and second turns has a tool path length that is less than 50%, such as less than 25%, of the total tool path length.

With such method(s), it is possible to create 3D items with holes, such as openings in walls, like side walls, which are well defined with less or essentially no defects compared to a solution where the opening edges may at least partly be defined by terminating the 3D printing process at such (future) edge. Further, with such method it is possible to reduce use of 3D printable material, as walls do not need to be 3D printed double (or triple . . . ) over their entire length. Further, with such method(s) it is also possible to create walls with holes which walls do essentially not have seams. Hence, the invention may especially be relevant for an opening that is created in a part of a 3D item that is non-parallel to the receiver item, such as especially (3D printed) perpendicular to the receiver item.

As indicated above, the invention provides a method for producing a 3D item by means of fused deposition modelling. The method comprises a 3D printing stage comprising layer-wise depositing an extrudate comprising 3D printable material, to provide the 3D item comprising 3D printed material. In this way, the 3D printed item may be created, layer by layer. The 3D printable material is especially 3D printed on a receiver item. After a first layer on the receiver item, further layers may be stacked on top of the first layer. Hence, especially the 3D item comprises a plurality of layers of 3D printed material.

Herein, the opening may especially be defined by at least two layers, wherein at least one layer may form a bottom or top edge of the opening, and the other layer may include an interruption forming (also) the opening, especially the (side) edge of the open. The opening is especially available in a 3D printed wall. The opening may be circumferential, like e.g. a rectangular shaped opening, with especially the entire opening edge being defined by 3D printed material. However, also embodiments may herein be included wherein the opening edge is not completely circumferential, like e.g. a U-shaped or a V-shaped or a ∩-shaped etc. In principle, even a slit like opening may be possible, like a cylinder that is not completely circumferential. However, especially herein the openings have circumferential opening edges, like a rectangular or substantially circular shaped opening. Hence, the phrase "of one or more ((respective)) layers of the plurality of layers and similar phrases may refer to all 3D printed layers but may especially refer to a number smaller than the total number of the 3D printed layers.

The term "opening" may also refer to a plurality of different openings, which may all be the same (in shape and size) or of which two or more of the plurality of different opening have different dimensions.

As indicated above, the 3D item may comprise an opening in the 3D printed material at least partly defined by one or more interruptions in a subset of one or more (respective)) layers of the plurality of layers. Hence, there can be a single layer comprising an interruption, wherein the interruption defined at least partly the opening. However, there can also be two or more layers, each including an interruption, wherein the interruptions together define at least part of the opening. Here, the phrase "at least partly defined", and similar phrases is used, as the opening may further be defined by a lower layer and/or an upper layer, which may also define part of the opening edge (see also above). Hence, the opening may especially be defined by an opening edge.

At least part of the opening edge, especially the side edges, is defined by U-turns. The opening edge may in embodiments especially defined by U-shapes, such as U-shapes at the side edges. This U-shape is 3D printed, and implies creation of a layer, formation at the opening edge to be a turn, and turning back while 3D printing. This latter part may in embodiments be relatively short in order to reduce use of 3D printable material. Further, this turning backwards may especially be at an inside of a 3D item, such as at the inside of a hollow 3D printed item. Would the (shorter) part in the inside be terminated, the end part of such part may be less well defined. However, that may not be an issue as it is only located at the inside of the 3D printed item. Hence, the appearance may not be affected, the functionality may not be affected, the safety (such as in view of touching the external surface) may not be affected, while the opening edge may be well-defined.

Of course, the turns are especially created at both sides of the opening, in the same layer, as the opening is defined by interruptions. In fact, the oppositely arranged turns in the layer defined the interruption in the layer.

Hence, in embodiments the one or more interruptions in each of the one or more layers of the subset are provided by 3D printing each of the one or more layers of the subset with oppositely arranged turns. Especially, the oppositely arranged turns may thus defining oppositely arranged parts of the opening edge.

As indicated above, in embodiments over a relatively short length there may be some 3D printing along the earlier formed layer by printing in a backwards direction after the turn. Hence, a part of the layer may be a kind of folded. However, this is thus in specific embodiments only a part, in order to reduce use of 3D printable material, while the desired effect, a well-defined opening may (nevertheless) be created. However, other embodiments may also be possible.

Hence, the (respective) turns connect (respective) layer parts forming legs of the (respective) turns, which (respective) layer parts are configured adjacent. Especially, for the (respective) turns applies that a (respective) second layer part (having a second length (L2)) is shorter than a (respective) first layer part (having a first length (L1)). In this way, over only part of the (respective) layer, the (respective) layer parts are configured adjacent.

Here, the word "(respective)" is amongst others used in relation to the fact that the indications may apply to both oppositely arranged turns. Note that the term "layer" may refer to a single integral layer but may in specific embodiments also refer to a plurality of different layers at essentially the same height. In this way, the interruption can be in an integral layer. However, the interruption may also be formed in two layers, which may virtually seem a single layer only interrupted by the interruption.

In embodiments, the subset of the one or more layers may define an external item side part and an internal item side part of the 3D item. Especially, the first layer part(s) may define the external item side part. As indicated above, the part that is printed back may especially be configured at an internal part of the 3D item. Hence, in embodiments the second layer part(s) may be configured at the internal item side part.

As indicated above, the part that is printed in a backwards direction may in embodiments be relatively short. In specific embodiments, the layers have a layer width (W). Further, in specific embodiments the second length (L2) is selected from the range of L2≥2*W. The second length may especially be defined by the length from the turn to a terminal part of the second layer part or to a part where the second layer part changes into another part, such as a higher or lower positioned layer, or another angle or turn.

In embodiments, the second length is essentially the length over which the second layer part is configured essentially parallel to the first layer part.

Likewise, the first length may especially be defined by the length from the turn to a terminal part of such first layer part or to a part where the first layer part changes into another part, such as a higher or lower positioned layer, or another angle or turn.

In specific embodiments, the second length (L2) is selected from the range of the shorter of (a) 3*W≤L2≤20*W and (b) 3*W≤L2<L1, such as 3*W≤L2≤0.5*L1. However, the second length may also be longer.

Such lengths of the second layer part may provide the desired strength of the turn and also may allow a good adhesion of the second part to the first part and/or may provide a good basis for another second part on top of the afore-mentioned second part.

In embodiments, L1≥5W. Especially, an embodiments L1≥10W, like L1≥20W.

As indicated above, in embodiments the (respective) turns connect (respective) layer parts, wherein there may be at least one ((respective)) set of tangentials to the (respective) layer parts connected to a (respective) turn that have a mutual angle (θ) equal to or smaller than 90°. Note: a tangential to a straight and unbend layer has an angle of 0° with such layer. The first layer part and the second layer part are connected by the turns, such as U-turns. Hence, tangentials to these layer parts, especially directly before the turn, have mutual angles θ. When a smallest mutual angle θ is equal to or smaller than 90°, especially smaller, then the edge may be well-defined. An angle θ of 90° indicates that the layer parts of the (respective) turn, especially the part of the layers parts directly before the turn, are configured under an angle of 90°. A θ of 0° indicates that the layer parts of the (respective) turn, especially the part of the layers parts directly before the turn, are configured parallel, in fact anti-parallel. This is the case when the turn is a U-turn.

In embodiments of a U-turn shape turn, the path length (Lr) may be about π*r1. Hence, especially, the path length is selected from the range of at least 0.9*π*r1≤Lr≤π*r1. In embodiments wherein the path length (Lr) is about π*r1, then the first layer part and the second layer part may be configured parallel over the length of the second layer part.

The paths length may especially be defined as the length along the arc of the turn. Hence, the path length is especially the length of the arc (i.e. the length along the arc). In a perfect U-turn, the length of the arc is π*r1. In such embodiments, the tool path may have made a turn of 180°, i.e. a half circle. This may also be indicated as the "angle of the arc" or "arc angle" or the angle of the circular sector defined by the arc (which arc is defined by r1) or the "central angle".

A turn may start at a point where there is a change in radius of the layer. Here, it is especially referred to a radius in a plane parallel to the receiver item or to a plane parallel to axes of elongations of the layers and also including an axis of elongation. Especially, such plane is perpendicular to a stack of layers (on top of each other). Further, especially such plane is parallel to the width of layers and perpendicular to the height of layers. Hence, at turns a radius of a layer, wherein the radius is defined parallel to such layer, may change in value. This may indicate a beginning or end of a turn. For instance, a straight layer may bend, i.e. a radius of ∞ changes to a radius smaller than ∞. Or, a turn may end in a straight layer, i.e. a radius smaller than ∞ changes into a radius of ∞. Also, a curved layer may change into a curved layer with a stronger curvature. Or, a turn may end in a curved layer with a smaller curvature than of the turn.

In embodiments, the radius along the path length or arc is essentially constant. In other embodiments, there may be some variation along the path length. In embodiments, the ratio between the largest radius and the shortest radius along the path length of a turn, wherein there is some variation of the radius along the path length, may be at maximum about 10, such as especially at maximum about 5, like even more especially at maximum about 2.

The radius may be at least the width of the layer, such as in the case of a U-turn it may be. In general, the radius may be equal to or smaller than 10 times the width of the layer, such as equal to or smaller than 5 times the width of the layer. Hence, in embodiments the radius may be selected from the range of 1-5 times, like 1-4 times, the layer width (W). However, other dimensions may also be possible, such as larger than 10 times the width of the layer(s).

Especially, in embodiments the radius may be defined by at least that part of the layer that also defines the opening edge (and/or at least part of the item contour).

Hence, especially the first layer part and the second layer part are connected via a turn. The layer parts may have a mutual angle, which may be essentially 0° when the turn is a U-turn. Note that the arc angle or central angle may then essentially be 180°.

In the turn, the first layer part changes into a second layer part (or vice versa). The length of a layer may be measured along a longitudinal axis of the layer (or axis of elongation (of the layer)). As indicated herein, the layers may be curved, such as in the case of a item with a circular cross-section. The length of a layer may thus be defined the length of a longitudinal axis or axis of elegation of the layer, including possible curves therein. Likewise, length of a layer part may be measured along a longitudinal axis. As indicated herein, the layer parts may be curved, such as in the case of a item with a circular cross-section. The length of a layer part may thus be defined the length of a longitudinal axis or axis of elegation of the layer part, including possible curves therein.

As the first layer part changes into a second layer part (or vice versa), the length of the first layer part or of the second layer part may be measured until a point on an axis of elongation that is closest to the opening edge. At that point, it may be considered that the first layer part changes into a second layer part (or vice versa).

Hence, the phrase "each turn may connect a first layer part and a second layer part" or the phrase "the layer parts form legs of the turns", and similar phrases, may also indicate that the in the turn the first layer part changes into the second layer part (or the second layer part changes into the first layer part).

The layers may have longitudinal axes or axes of elongation. In general, these will be essentially parallel to the receiver item. The tangents are especially parallel to a plane, or especially in within the same plane, defined by the axes of elongation of the layer in both layer parts of a (respective) turn.

In specific embodiments, when the (respective) layer parts connected to a (respective) turn are configured parallel, then they are configured parallel only over part of a first length (L1) of the (respective) first layer part 3221. In this way, the amount of 3D printable material need is reduced and wall thickness is not necessarily based on two adjacent layers over a large part of the first length.

The opening is amongst others defined by 3D printed material at both sides. The 3D printed material at both sides can be seen as a kind of tilts. Each tilt may be formed by a single layer, which leads to an opening having a height essentially equal to the layer height. However, each tilt may also be formed by more than one layer of 3D printed material, i.e. the tilt(s) are formed by a stack of two or more layers of 3D printed material. In such embodiments, the (respective) tilts may be created in a 3D printing stage wherein layer by layer the tilts are created. In such process, each step in height in a layer formation process may imply an increase in height of the tilts. However, it may also be possible to first 3D print a first tilt and then 3D print a second tilt. This may imply different steps in height, whereby after the first tilt is ready, the 3D printing is started at the bottom of the opening, and then the second tilt is created, layer by layer.

Hence, in embodiments the layers have a layer height (H), wherein the opening has an opening height $H_{O,2}$, wherein the subset comprises two or more ((respective)) layers of the plurality of layers. Especially, in embodiments the opening height $H_{O,2} \geq 2*H$. Especially, the opening may define a first tilt part and a second tilt part separated by the opening. In yet further embodiments, the 3D printing stage may (then) comprise either (a) 3D printing first one of the tilts (and subsequently the other of the tilts, or (b) printing sequentially each of the (respective) layers of the subset of layers thereby 3D printing layer by layer the tilts.

Each tilt comprises one or more layers with an interruption defined by turn, with both turns having the first layer parts and second layer parts as legs of the turns, respectively.

As indicated above, in embodiments the opening height $H_{O,2} \geq 2*H$. However, in other embodiments $H_{O,2} \geq H$. Especially, in embodiments $H_{O,2} \geq n*H$, wherein n is a natural number, such as 1, 2, 3, etc. As indicated above, in specific embodiments n is at least 2.

After printing the second layer part, at length L2 the 3D printing may be terminated, in the sense that e.g. the head further moves, but the feeding of the 3D printable material is interrupted. Thereby, effectively the formation of the second layer part is terminated. Then, the printer head may move to another part of the 3D item under construction or of the receiver item (dependent upon the development stage of the 3D item). This other part may e.g. somewhere opposite of the opening (under construction) to provide the oppositely arranged turn and associated first layer part and second layer part. However, it may also be possible to start a next layer on the just earlier printed layer. This may be done at a starting point of the earlier 3D printed first layer element (but one layer higher). Alternatively, this may also be done at the just finished second layer part. In such embodiments, after reaching a termination position of the second layer element, in fact 3D printing may commence in the sense that the printer head keeps on extruding 3D printable material (extrudate), but also moves to a level higher, and returns along the earlier deposited second layer element while 3D printing a new second layer element, 3D printing a new turn over the earlier printed turn, and commence with the first layer element over the just deposited first layer element.

Hence, in embodiments of the method, the opening edge comprises a first edge side and a second edge side separated by the opening, wherein:
the 3D printing stage comprises;
an opening formation stage comprising generating in a first edge side 3D printing process the first edge side and in a second edge side 3D printing process the second edge side, wherein each of the edge side 3D printing processes comprises:
3D printing at least part of one of the layers along a first printing path, providing the first length (L1), thereby providing the first layer part;
changing from the first printing path to a second printing path by making a turn while continuing 3D printing the at least part of one of the layers;
continuing further 3D printing the at least part of one of the layers along the second printing path, providing the second length (L2), thereby providing the second layer part adjacent to the first layer part until a (respective) termination position where L2<L1;
unless the 3D item is finalized: (i) terminating 3D at the (respective) termination position, and continuing the 3D printing stage at a position other than the (respective) termination position, or (ii) continuing the 3D printing stage while changing to a next layer over the earlier 3D printed second layer part.

Especially, in embodiments (see also above) after reaching a (respective) termination position, the 3D printing stage is continued further with a new layer over the earlier printed layer, starting either at the a second layer part for the new layer in relation to a turn over the earlier printed turn or at a first layer part for the new layer in relation to the turn over the earlier printed turn.

However, in other embodiments the second layer part may not be terminated at a termination position, and 3D printing may continue, e.g. to arrive at another turn, e.g. opposite of the earlier printed turn.

It is possible to create outer surfaces of 3D printed hollow elements with seams. This may be less desired. When applying e.g. spiralize printing or spiralized printing, it is possible to create such outer surface without seams. With the present invention, even when creating openings in the outer surface, seamless printing of such outer surface may also be possible. Hence, in embodiments wherein the subset of the one or more ((respective)) layers of the plurality of layers define at least part of an item contour ("contour") of the 3D item, and the 3D printing stage comprises spiralized printing. The item contour may also be a side surface or outer surface. In embodiments, the item contour is at least partly defined by the first layer parts.

As can be derived from the above, a method for producing a 3D item by means of fused deposition modelling comprises a 3D printing stage comprising layer-wise depositing an extrudate comprising 3D printable material, to provide the 3D item comprising 3D printed material (on a receiver item), wherein the 3D item comprises a plurality of layers of 3D printed material, wherein the 3D item comprises an opening in the 3D printed material at least partly defined by one or more interruptions in a subset of one or more ((respective)) layers of the plurality of layers, wherein the opening is defined by an opening edge, wherein the one or more interruptions in each of the one or more layers of the subset are provided by 3D printing each of the one or more layers of the subset with oppositely arranged turns (defining oppositely arranged parts of the opening edge), wherein the (respective) turns connect (respective) layer parts forming legs of the (respective) turns, which (respective) layer parts are configured adjacent, wherein for the (respective) turns applies that a (respective) second layer part having a second length (L2) is shorter than a (respective) first layer part having a first length (L1) such that over only part of the (respective) layer, the (respective) layer parts are configured adjacent.

As can be derived from the above, a method for producing a 3D item by means of fused deposition modelling comprises a 3D printing stage comprising layer-wise depositing an extrudate comprising 3D printable material, to provide the 3D item comprising 3D printed material (on a receiver item), wherein the 3D item comprises a plurality of layers of 3D printed material, wherein the 3D item comprises an opening in the 3D printed material at least partly defined by one or more interruptions in a subset of one or more ((respective)) layers of the plurality of layers, wherein the opening is defined by an opening edge, wherein the one or more interruptions in each of the one or more layers of the subset are provided by 3D printing each of the one or more layers of the subset with oppositely arranged turns (defining oppositely arranged parts of the opening edge), wherein the (respective) turns connect (respective) layer parts, wherein there is at least one ((respective)) set of tangentials to the (respective) layer parts connected to a (respective) turn that have a mutual angle ($\theta$) equal to or smaller than 90°, especially smaller than 90°.

As can be derived from the above, a method for producing a 3D item by means of fused deposition modelling produces a 3D item that comprises: a plurality of layers of 3D printed material, and an opening in the 3D printed material, the opening having an opening edge that is at least partly defined by one or more interruptions in a subset of one or more layers of the plurality of layers, wherein each interruption is provided by 3D printing a layer of the subset with oppositely arranged turns, wherein each turn connects a first layer part and a second layer part, wherein each turn has a path length (Lr) with a radius of curvature (r1), and wherein each path length (Lr) is at least $0.5*\pi*r1$, such as selected from the range of $0.9*\pi*r1 \leq Lr \leq \pi*r1$.

A further method for producing a 3D item by means of fused deposition modelling, wherein the 3D item comprises a layer stack having an opening with an opening edge, one or more layers of the layer stack having first and second regions at opposite sides of the opening edge, comprises the step of moving a printer head along a tool path having a tool path length to deposited each of the one or more layers, wherein the tool path has a first turn to form the first region and a second turn to form the second region, wherein each of the first and second turns has an angle θ2 of in embodiments at least 90°, and wherein the part of the tool path between the first and second turns has a tool path length that is less than 50% of the total tool path length, such as less than 40%, like less than 30%, like equal to or less than 25%, such as equal to or less than 20%.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefin based elastomers, styrene based elastomers, etc. Optionally, the 3D printable material comprises a 3D printable material selected from the group consisting of Urea formaldehyde, Polyester resin, Epoxy resin, Melamine formaldehyde, thermoplastic elastomer, etc. . . . . Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefin may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA).

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. . . . . Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. . . . . Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structure (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one or more post processing actions may be executed after removing the printed item from the receiver item. Post processing may include e.g. one or more of polishing, coating, adding a functional component, etc. . . . . Post-processing may include smoothening the ribbed structures, which may lead to an essentially smooth surface.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein. Hence, in an aspect the invention (thus) provides a software product, which, when running on a computer is capable of bringing about (one or more embodiments of) the method (for producing a 3D item by means of fused deposition modelling) as described herein.

The herein described method provides 3D printed items. Hence, the invention also provides in a further aspect a 3D printed item obtainable with the herein described method. In a further aspect a 3D printed item obtainable with the herein described method is provided. Especially, the invention provides a 3D item comprising 3D printed material, wherein the 3D item comprises one or more layers, especially a plurality of layers, of 3D printed material, wherein the 3D item comprises an opening in the 3D printed material at least partly defined by one or more interruptions in a subset of one or more ((respective)) layers of the plurality of layers. Especially, the opening may be defined by an opening edge. Further, the one or more interruptions in each of the one or more layers of the subset may especially be defined by oppositely arranged turns. These turns may define oppositely arranged parts of the opening edge. Further, the (respective) turns especially connect (respective) layer parts.

In embodiments, wherein there is at least one ((respective)) set of tangentials to the (respective) layer parts connected to a (respective) turn that have a mutual angle ($\theta$) equal to or smaller than 90°, especially smaller than 90°.

The (respective) turns connect (respective) layer parts forming legs of the (respective) turns. The (respective) layer parts are configured adjacent. Especially, for the (respective) turns a (respective) second layer part has a second length ($L2$) which is shorter than a (respective) first layer part having a first length ($L1$). Thereby, over only part of the (respective) layer, the (respective) layer parts may be configured adjacent. Over another part of the respective layer, there is only the first layer part.

In the 3D printed item, each turn connects a first layer part and a second layer part, wherein each turn has a path length ($Lr$) with a radius of curvature ($r1$), and wherein each path length ($Lr$) is selected from the range of $0.9*\pi*r1 \leq Lr \leq \pi*r1$ (U-turn like turn).

Hence, in an aspect the invention also provides a 3D item comprising 3D printed material, wherein the 3D item comprises a plurality of layers of 3D printed material, an opening in the 3D printed material, the opening having an opening edge that is at least partly defined by one or more interruptions in a subset of one or more layers of the plurality of layers, wherein each interruption is defined by oppositely arranged turns, wherein each turn connects a first layer part and a second layer part, wherein each turn has a path length ($Lr$) with a radius of curvature ($r1$), and wherein each path length ($Lr$) is selected from the range of $0.9*\pi*r1 \leq Lr \leq \pi*r1$. The layer parts form legs of the turns. The turns comprise U-turns, which layer parts are configured adjacent. For the U-turns, a second layer part having a second length is shorter than a first layer part having a first length such that over only part of the layer, the layer parts are configured adjacent.

As indicated above, such 3D item(s) may allow reducing the use of 3D printable material and/or provide well-defined opening (edges).

Alternatively or additionally, a 3D item comprises 3D printed material, wherein the 3D item comprises a plurality of layers of 3D printed material, wherein the 3D item comprises an opening in the 3D printed material at least partly defined by one or more interruptions in a subset of one or more ((respective)) layers of the plurality of layers, wherein the opening is defined by an opening edge, wherein the one or more interruptions in each of the one or more layers of the subset are defined by oppositely arranged turns (defining oppositely arranged parts of the opening edge), wherein the (respective) turns connect (respective) layer parts, wherein there is at least one ((respective)) set of tangentials to the (respective) layer parts connected to a (respective) turn that have a mutual angle ($\theta$) equal to or smaller than 90°, especially smaller than 90°.

Alternatively or additionally, a 3D item comprises 3D printed material, wherein the 3D item comprises a plurality of layers of 3D printed material, wherein the 3D item comprises an opening in the 3D printed material at least partly defined by one or more interruptions in a subset of one or more ((respective)) layers of the plurality of layers, wherein the opening is defined by an opening edge, wherein the one or more interruptions in each of the one or more layers of the subset are defined by oppositely arranged turns (which may define oppositely arranged parts of the opening edge), wherein the (respective) turns connect (respective) layer parts forming legs of the (respective) turns, which (respective) layer parts are configured adjacent, wherein for the (respective) turns applies that a (respective) second layer part having a second length (L2) is shorter than a (respective) first layer part having a first length (L1) such that over only part of the (respective) layer, the (respective) layer parts are configured adjacent.

Alternatively or additionally, a 3D item comprises 3D printed material, wherein the 3D item comprises a plurality of layers of 3D printed material, an opening in the 3D printed material, the opening having an opening edge that is at least partly defined by one or more interruptions in a subset of one or more layers of the plurality of layers, wherein each interruption is defined by oppositely arranged turns, wherein each turn connects a first layer part and a second layer part, wherein each turn has a path length (Lr) with a radius of curvature (r1), and wherein each path length (Lr) is at least $0.5*\pi*r1$, such as selected from the range of $0.9*\pi*r1 \leq Lr \leq \pi*r1$.

The 3D printed item may comprise a plurality of layers on top of each other, i.e. stacked layers. The width (thickness) and height of (individually 3D printed) layers may e.g. in embodiments be selected from the range of 100-5000 µm, such as 200-2500 µm, with the height in general being smaller than the width. For instance, the ratio of height and width may be equal to or smaller than 0.8, such as equal to or smaller than 0.6.

Layers may be core-shell layers or may consist of a single material. Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated below when discussing the method. Below, some specific embodiments in relation to the 3D printed item are discussed in more detail.

As indicated above, in embodiments the subset of the one or more layers define an external item side part and an internal item side part of the 3D item, wherein the first layer part(s) define the external item side part, and wherein the second layer part(s) are configured at the internal item side part.

Further, in specific embodiments the layers have a layer width (W), wherein the second length (L2) is selected from the range of the shorter of (a) $3*W \leq L2 \leq 20*W$ and (b) $3*W \leq L2 < L1$, such as $3*W \leq L2 \leq 0.5*L1$. Hence, over a length $2*W \leq L2 \leq 20*W$, like $3*W \leq L2 \leq 20*W$, the second layer part and the first layer part may be configured essentially parallel (and adjacent), whereby the second layer part is shorter than the first layer part. especially, the first layer part may have a length which is defined by at least twice, even more especially at least three times, the second layer length.

Each turn connects a first layer part and a second layer part, wherein each turn has a path length (Lr) with a radius of curvature (r1), and wherein each path length (Lr) is selected from the range of $0.9*\pi*r1 \leq Lr \leq \pi*r1$ (U-turn like turn). In embodiments wherein the path length (Lr) is about $\pi*r1$, then the first layer part and the second layer part may be configured parallel over the length of the second layer part.

The (with the herein described method) obtained 3D printed item may be functional per se. For instance, the 3D printed item may be a lens, a collimator, a reflector, etc. . . . . The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. . . . . The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. . . . . Alternatively, or additionally, the functional component may comprise a thermal component (e.g. configured to cool or to heat an electrical component). Hence, the functional component may be configured to generate heat or to scavenge heat, etc.

As indicated above, the 3D printed item maybe used for different purposes. Amongst others, the 3D printed item maybe used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component.

The invention also provides in an aspect a device comprising the 3D item as defined herein. In embodiments, the device may further comprise a transport element, wherein part of the transport element is enclosed by the opening, and wherein the transport element is configured to transport one or more of a gas, liquid, light, and electricity. The transport element may e.g. comprise an electrical cable, a gas conduit, a liquid conduit, an optical fiber, etc. etc.

Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc. . . . . In embodiments, the 3D item may be configured as shade. A device or system may comprise a plurality of different 3D printed items, having different functionalities.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material, wherein the fused deposition modeling 3D printer further comprises (c) a control system (C), wherein the control system (C) is configured to execute the method as defined herein.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, wherein the fused deposition modeling 3D printer further comprises (c) a control system (C), wherein the control system (C) is configured to execute the method as defined herein.

Especially, the 3D printer comprises a controller (or is functionally coupled to a controller) that is configured to execute in a controlling mode (or "operation mode") the method as described herein.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-3j schematically depict some aspects of the invention; and

The schematic drawings are not necessarily to scale.

DETAILED DESCRIPTION OF THE EMBODIMENTS

Figure 1A:
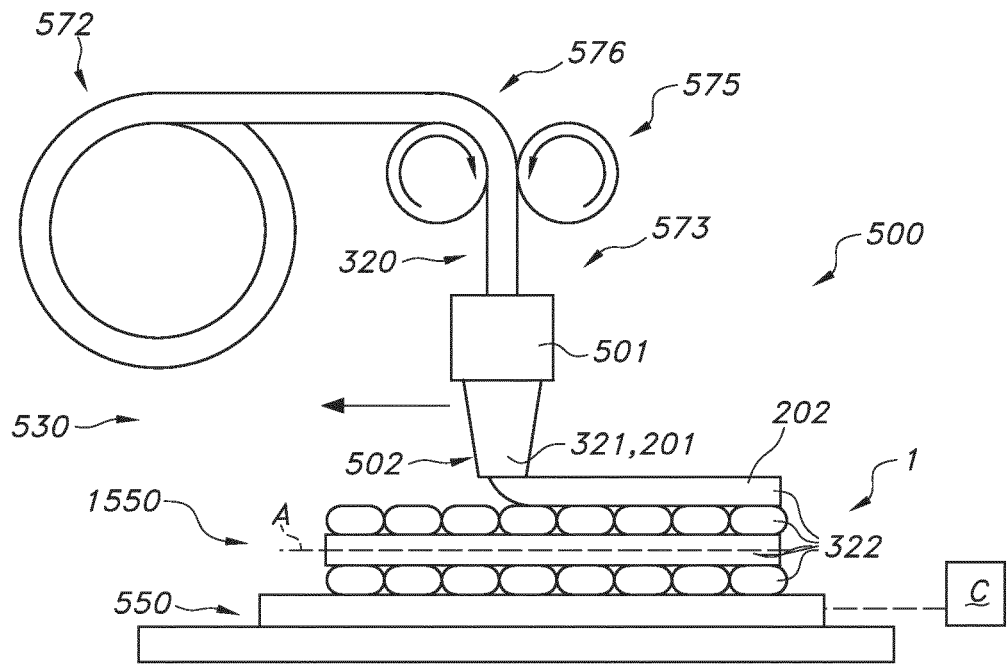
FIGS. 1a-1c schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. The 3D printer of the present invention may especially include a plurality of printer heads (see below). Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layers 322 comprises 3D printable material 201, such as having a melting point $T_m$. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321.

The 3D printer 500 may be configured to heat the filament 320 material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322 and/or layer 322t on layer 322, a 3D item 1 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
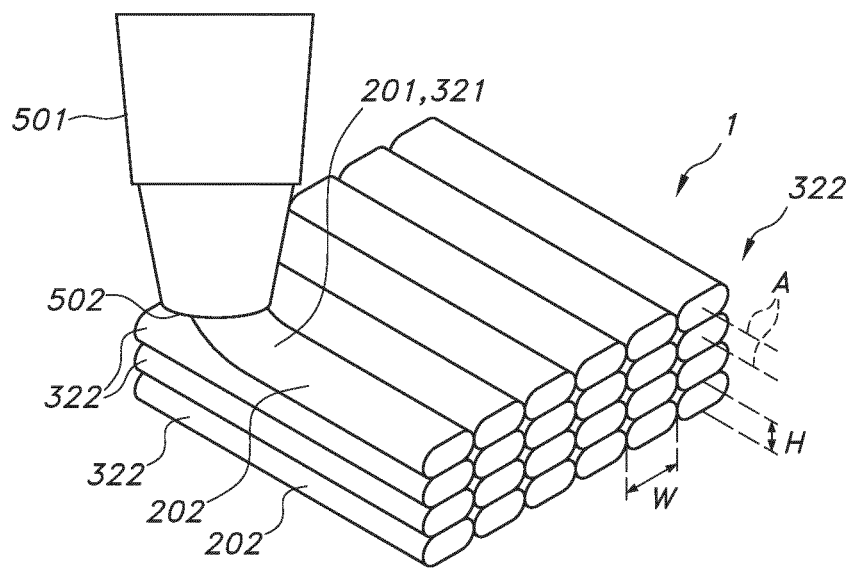

FIG. 1b schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the first or second printable material or the first or second printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
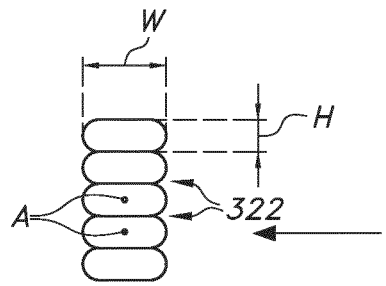

FIG. 1c schematically depicts a stack of 3D printed layers 322, each having a layer height H and a layer width W. Note that in embodiments the layer width and/or layer height may differ for two or more layers 322. Reference 252 in FIG. 1c indicates the item surface of the 3D item (schematically depicted in FIG. 1c).

Referring to FIGS. 1a-1c, the filament of 3D printable material that is deposited leads to a layer having a height H (and width W). Depositing layer 322 after layer 322, the 3D item 1 is generated.

Figure 2A:
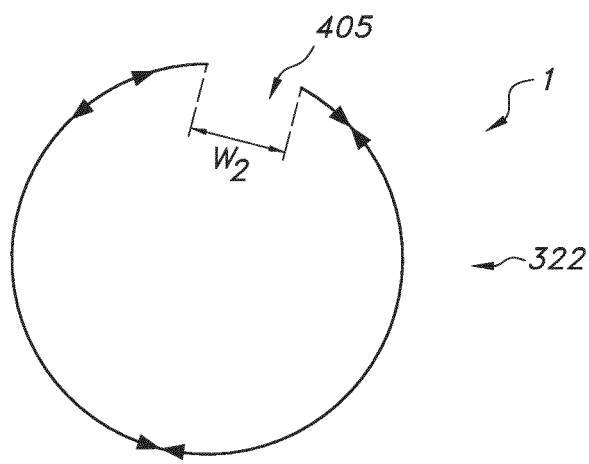
FIGS. 2a-2d schematically depict some considerations and some aspects in relation to the invention or included as embodiments of the invention.

In luminaires, holes are often used for bringing electrical wires to the drivers and/or LED boards. When conventional spiralized printing is used for printing walls with a single hole printer head moves twice along the same path defining the wall each time depositing material. Subsequently the object is moved long z axis to the following level and the deposition starts again. Printing the same layer twice is schematically shown in FIG. 2a. This may include stopping printing (depositing material) at a point defining the beginning of the hole, move the head (without material deposition) to the point defining the end of the hole and start printing from there on as shown in FIG. 2a.

In FIG. 2a, reference 405 indicates an opening and reference W2 indicates an opening width.

Figure 2B:
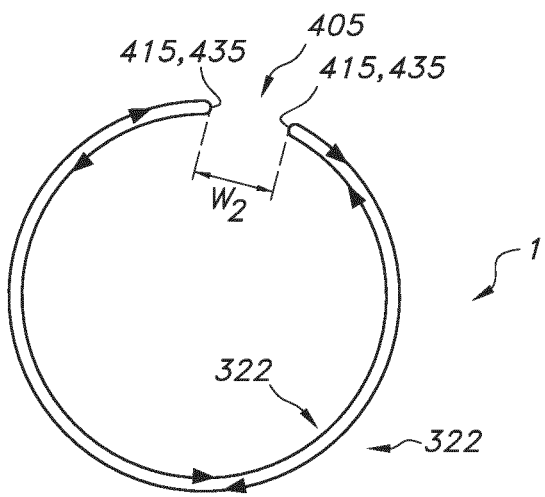

In order to avoid defects which, appear as a result of printing each level twice on top of each layer described above, strategy of printing at the same level twice but next to each other as shown in FIG. 2b is used. Here again spiralized printing is used to print a structure with a single hole however in this strategy, at the point where the hole starts printer head makes a turn and goes along the inner surface of the print until it reaches the point end position of the hole where it makes again another turn again and continues to print along the path which defines the outer surface. The turns which define the edges of the hole well controlled and defect free. However, the turns lead to printing a second wall in the area defining the periphery of the hole which cost extra time and material.

In FIG. 2b, reference 415 indicates a turn, here a U-turn. The U-turn is indicated with reference 435.

Figure 2C:
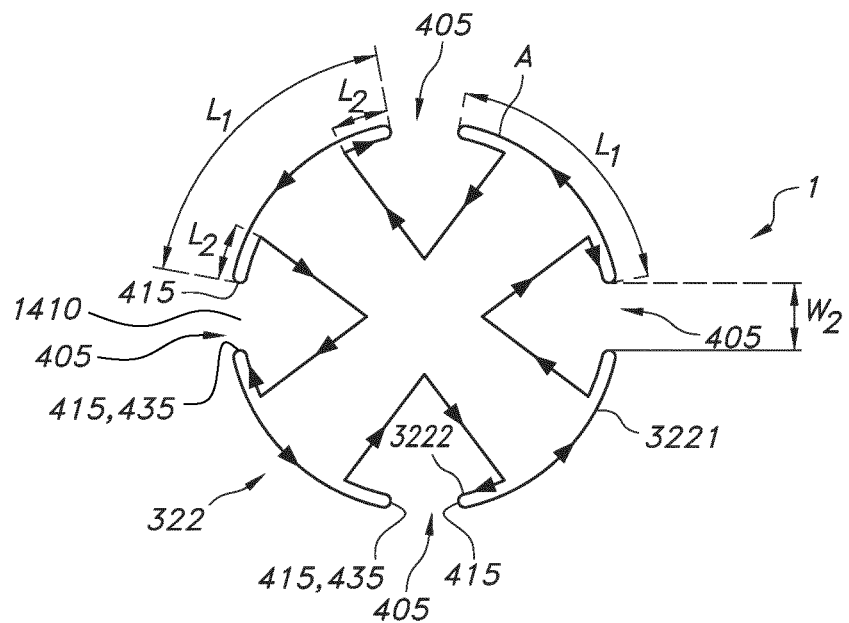

Another strategy for printing structures with holes can be by stopping printing (depositing material) at a point defining the beginning of the hole, moving the head (without material deposition) to the point defining the end of the hole and start printing from there on. However this strategy results in not well defined hole periphery which is not acceptable. Here we suggest a new strategy where we make use of continuous printing. In this strategy as described above during printing, at the point where the hole begins printer head makes a turn and prints around the hole inside object. When printing an object with multiple holes the strategy described above only works if multiple inner walls around the holes are produced as schematically shown in FIG. 2c.

References 3221 and 3222 indicate a first layer part and a second layer part, respectively. These may have lengths L1 and L2, respectively. Each turn 415 is connected to a (respective) first layer part 3221 and second layer part 3222. As the layers 322 may be curved, the lengths are also determined along the curvature (following an axis of elongation or longitudinal axis A).

It is also possible instead of printing all the way around next to the inner surface deposition is stopped at some distance away from the hole edge inner surface. At the end of this point the printer stops extruding and the printer head moves directly to another point some distance away from the end position of the hole where the printing starts again as schematically shown in FIG. 2d.

Figure 2D:
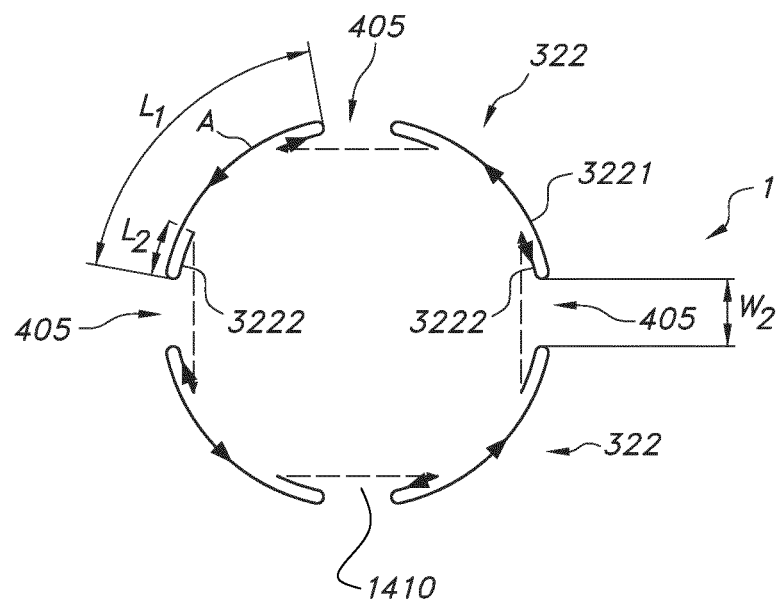

In FIG. 2d, after 3D printing the second layer part 3222 of a (respective) turn 415, the printer head may move, without providing 3D printable material, to a next position, here a next second layer part 3222 of another turn 415. This movement is indicated with the dashed line.

Referring to FIGS. 2a-2d, the plane of drawing may especially be a plane parallel to the receiver item/a plane parallel to axes of elongations of the layers and also including an axis of elongation. Especially, such plane is perpendicular to a stack of layers (on top of each other). Further, especially such plane is parallel to the width of layers and perpendicular to the height of layers.

FIGS. 2b an 2c, and also other figures, schematically depict embodiments wherein the second layer part may not be terminated at a termination position, and 3D printing may continue, e.g. to arrive at another turn, e.g. opposite of the earlier printed turn.

In embodiments, the printer head makes another turn and continues to print along the path which defines the outer surface. As above the turns which define the edges of the hole well controlled and defect free. Defects are at points where the printer head starts and stops with material extrusion which are inside the print therefore, they are not observed from outside. As a result of limited inner surface printing the additional time and material use are also very limited. In FIG. 3e (see further below) schematically a 3D print produced using the strategy described above is shown. First, however, some further aspects and embodiments are described.

FIGS. 3a-3c schematically depict a 3D item 1 from a front side (3a), in cross-sectional view (3b), and from the back side (3c), respectively. The 3D item 1 comprises a 3D printed material 202. The 3D item 1 comprises a plurality of layers 322 of 3D printed material 202. The 3D item 1 comprises an opening 405 in the 3D printed material 202 at least partly defined by one or more interruptions 1410 in a subset 1322 of one or more layers 322 of the plurality of layers 322. Note that more than one opening 405 may be available. Here, by way of example a single opening 405 is depicted. Hence, FIG. 3a schematically depicts an embodiment of an opening in a side surface of a 3D item 1.

The opening 405 is defined by an opening edge 410. The one or more interruptions 1410 in each of the one or more layers 322 of the subset 1322 are defined by oppositely arranged turns 415. These turns 415 may in fact define oppositely arranged parts 1415 of the opening edge 410. The (respective) turns 415 connect (respective) layer parts 3221, 3222 forming legs of the (respective) turns 415. The (respective) layer parts 3221,3222 are configured adjacent (essentially over the entire possible length of the second layer part 3222), wherein for the (respective) turns applies that a (respective) second layer part 3222 has a second length L2, which in embodiments is shorter than a (respective) first layer part 3221 having a first length L1. In this way, over only part of the (respective) layer 322, the (respective) layer parts 3221,3222 are configured adjacent.

As schematically depicted, the subset 1322 of the one or more layers 322 define an external item side part 11 and an internal item side part 12 of the 3D item 1, wherein the first layer parts 3221 define the external item side part 11, and wherein the second layer parts 3222 are configured at the internal item side part 12.

The layers 322 have a layer width W. In embodiments, the second length (L2) is selected from the range of L2≥2*W. In specific embodiments, the second length L2 is selected from the range of 2*W≤L2≤20*W or is selected from the range of 3*W≤L2≤0.5*L1. In yet more specific embodiments, the second length L2 is selected from the range of the shorter of a 2*W≤L2≤20*W and b 2*W≤L2≤0.5*L1, especially selected from the range of the shorter of (a) 3*W≤L2≤20*W and (b) 3*W≤L2<L1, such as 3*W≤L2≤0.5*L1.

Items indicated with ' or " indicate essentially the same items, but for the (respective) sides from the opening 405.

Figure 3D:
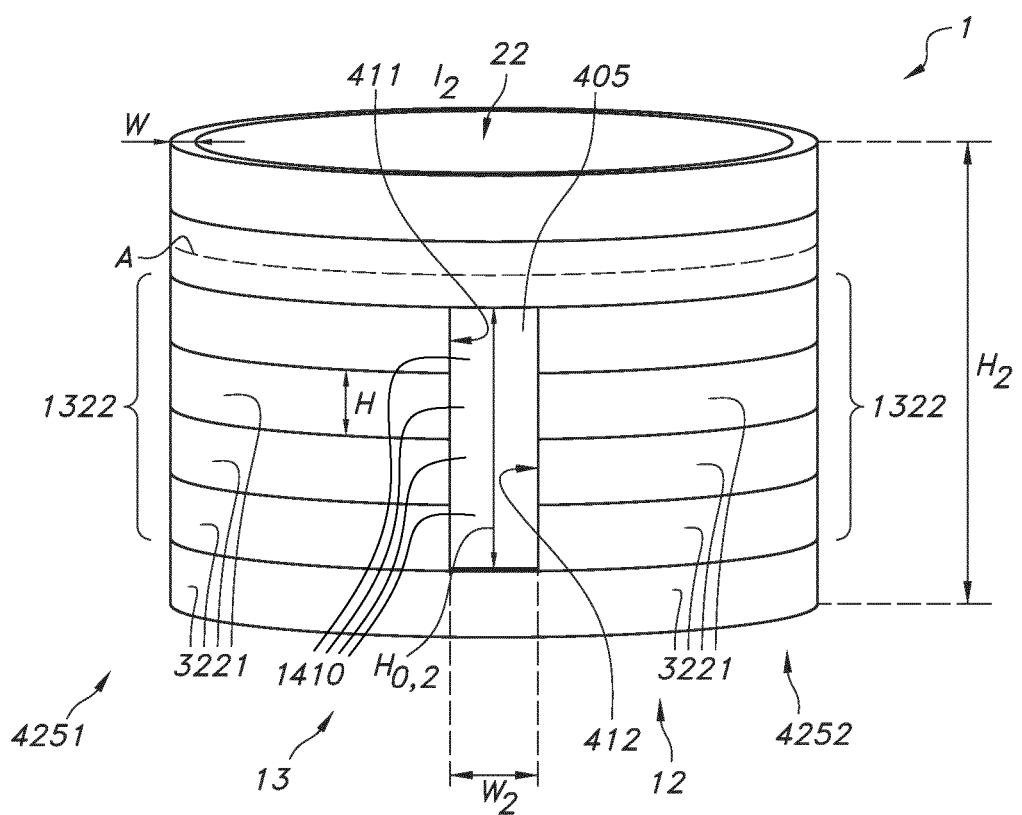
Figure 3E:
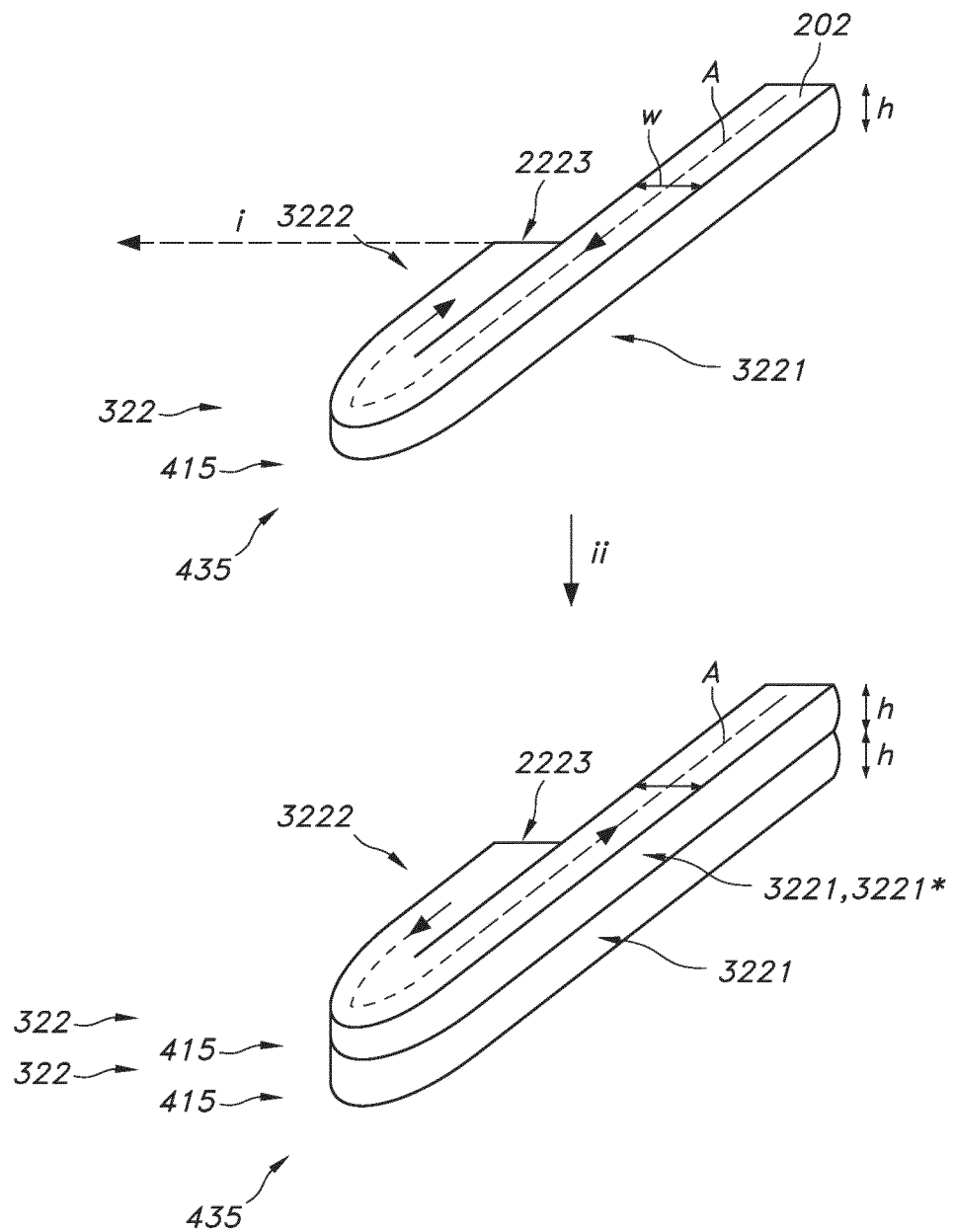

FIG. 3d schematically depicts an embodiment, such as e.g. a cylinder (optionally closed at the bottom (not shown), with an opening. In embodiments, the opening 405 has an opening height $H_{O,2}$. The subset 1322 comprises two or more ((respective)) layers 322 of the plurality of layers 322 (here four layers). Here, the opening height $H_{O,2} \geq 2*H$. Especially, the opening 405 defines a first tilt part 4251 and a second tilt part 4252 separated by the opening 405. As indicated below, to obtain such 3D item 1, the 3D printing stage may comprise either (a) 3D printing first one of the tilts 4251,4252 and subsequently the other of the tilts 4251,4252, or (b) printing sequentially each of the (respective) layers of the subset 1322 of layers 322 thereby 3D printing layer by layer the tilts 4251,4252.

As shown in FIG. 3d, the opening 405 may thus further be defined by a lower layer and/or an upper layer (here both a lower layer and upper layer define a lower and upper edge of the opening edge.

As schematically depicted in FIG. 3d (and other figures), at least part of the opening edge, especially the side edges, may be defined by turns 415, such as in specific embodiments U-turns (see e.g. FIG. 2d).

As schematically depicted in FIG. 3d, the subset 1322 of the one or more ((respective)) layers 322 of the plurality of layers 322 define at least part of an item contour 13 of the 3D item 1. This may e.g. be obtained when the 3D printing stage comprises spiralized printing.

The above described and herein depicted 3D item may e.g. be produced by means of fused deposition modelling. Such method may comprise a 3D printing stage comprising layer-wise depositing an extrudate 321 comprising 3D printable material 201, to provide the 3D item 1 comprising 3D printed material 202 (on a receiver item 550 (see also above)). The (thus obtained) 3D item 1 comprises one or more layers 322, especially a plurality of layers 322 of 3D printed material 202.

As also depicted in FIGS. 3a-3d, the 3D item 1 comprises an opening 405 in the 3D printed material 202 at least partly defined by one or more interruptions 1410 in a subset 1322 of one or more ((respective)) layers 322 of the one or more layers 322, or especially the plurality of layers 322.

The opening 405 is defined by an opening edge 410, wherein the one or more interruptions 1410 in each of the one or more layers 322 of the subset 1322 are provided by 3D printing each of the one or more layers 322 of the subset 1322 with oppositely arranged turns 415. As indicated above, the (respective) turns 415 connect (respective) layer parts 3221,3222 forming legs of the (respective) turns 415. The (respective) layer parts 3221,3222 are especially configured adjacent. Especially, for the (respective) turns may apply that a (respective) second layer part 3222 having a second length L2 is shorter than a (respective) first layer part 3221 having a first length L1 such that over only part of the (respective) layer 322, the (respective) layer parts 3221,3222 are configured adjacent.

As indicated above, the 3D printing stage may comprise either (a) 3D printing first one of the tilts 4251,4252 and subsequently the other of the tilts 4251,4252, or (b) printing sequentially each of the (respective) layers of the subset 1322 of layers 322 thereby 3D printing layer by layer the tilts 4251,4252.

FIGS. 3a-3d, and also other Figures, may thus also depict embodiments of the 3D item which comprises a layer stack having an opening with an opening edge, one or more layers of the layer stack having first and second regions at opposite sides of the opening edge, wherein the method comprises the step of moving a printer head along a tool path having a tool path length to deposited each of the one or more layers, wherein the tool path has a first turn to form the first region and a second turn to form the second region, wherein each of the first and second turns has an angle θ2 of at least 90°, such as larger than 90°, like at least about 120°, such as in embodiments 180°. Especially, in embodiments part of the tool path between the first and second turns has a tool path length that is less than 50%, such as less than 25%, of the total tool path length. See e.g. also FIGS. 2c and 2d, wherein the lines, including the dashed lines, may effectively also describe the tool path.

Referring to FIGS. 3a-3c, the plane of drawing in FIGS. 3a and 3c may essentially be perpendicular to a plane parallel to the receiver item or to a plane parallel to axes of elongations of the layers and also including an axis of elongation. Especially, such plane is perpendicular to a stack of layers (on top of each other). Further, especially such plane is parallel to the width of layers and perpendicular to the height of layers. However, in FIG. 3b the plane of drawing may be a plane parallel to the receiver item or to a plane parallel to axes of elongations of the layers and also including an axis of elongation. Especially, such plane is perpendicular to a stack of layers (on top of each other). Further, especially such plane is parallel to the width of layers and perpendicular to the height of layers.

This is schematically depicted in FIG. 3e, where first the layer parts 3221,3222, respectively are 3D printed, see printing path with dashed arrow. At a termination position 3223, two option may be chosen: discontinue 3D printing (or at least supply of 3D printable material from the printer nozzle and continue elsewhere 3D printing the 3D item, indicated with i, or discontinue or continue 3D printing by starting a new layer 322 on the earlier provided layer, see ii. This can be done by at the termination position 3223 discontinue the flow of 3D printable material from the nozzle, transport the nozzle to a higher level over the just 3D printed second layer part 3222, and return; see the dashed arrow back in the lower drawing. Or, this can be done in the same way, but while maintaining the flow of 3D printable material; see the dashed arrow back in the lower part of FIG. 3e. Note that option ii does not necessarily start at the termination position 3223 but may also start at the other end.

In these way, a tilt may be formed layer by layer via option ii, whereas e.g. via option i the sequence may be forming a layer for the first tilt and the second tilt, forming a second layer for the first tilt and the second tilt (or vice versa), etc.

As shown in FIG. 3a-3d, the opening edge 410 comprises a first edge side 411 and a second edge side 412 separated by the opening 405. Referring also to FIG. 3e, the 3D printing stage may comprise an opening formation stage comprising generating in a first edge side 3D printing process the first edge side 411 and in a second edge side 3D printing process the second edge side 412, wherein each of the edge side 3D printing processes comprises: (a) 3D printing at least part of one of the layers 322 along a first printing path, providing the first length L1, thereby providing the first layer part 3221; (b) changing from the first printing path to a second printing path by making a turn 415 while continuing 3D printing the at least part of one of the layers 322; (c) continuing further 3D printing the at least part of one of the layers 322 along the second printing path, providing the second length L2, thereby providing the second layer part 3222 adjacent to the first layer part 3221 until a (respective) termination position 3223 where L2<L1;

(d) unless the 3D item 1 is finalized: (i) terminating 3D at the (respective) termination position 3223, and continuing the 3D printing stage at a position other than the (respective) termination position 3223, or (ii) continuing the 3D printing stage while changing to a next layer 322 over the earlier 3D printed second layer part 3222.

As indicated above, after reaching a (respective) termination position 3223, the 3D printing stage may thus be continued further with a new layer 322 over the earlier printed layer 322 (see FIG. 3e: ii) starting either at the a second layer part 3222 for the new layer 322 in relation to a turn 415 over the earlier printed turn 415 (as depicted in FIG. 3e) or at a first layer part 3221 for the new layer 322 in relation to the turn 415 over the earlier printed turn 415.

Referring to e.g. FIGS. 3a-3e, the length of a layer may be measured along a longitudinal axis A of the layer 322.

Figure 3F:
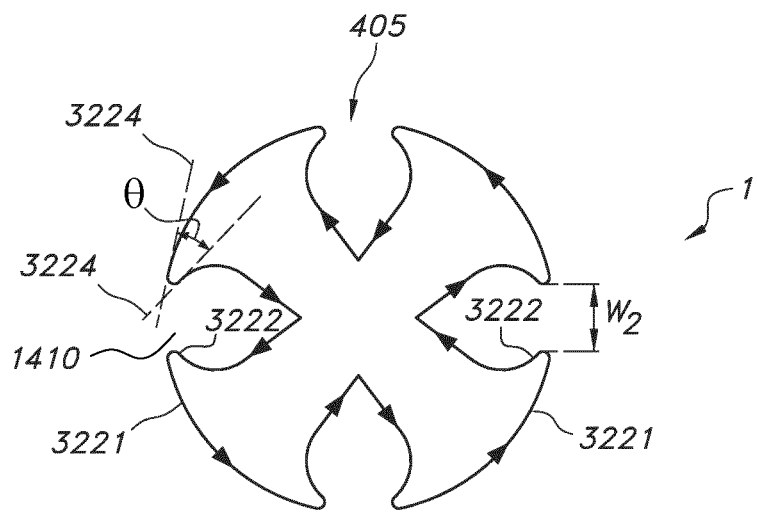
Figure 3G:
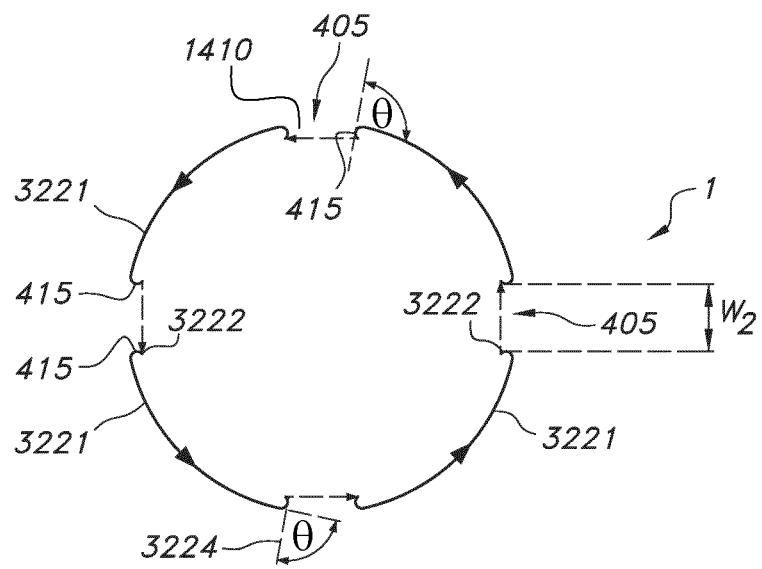

Instead of U-turns 435, also other types of turns 415 may be applied. FIGS. 3f-3g schematically depict essentially the same embodiments as schematically depicted in FIGS. 2c and 2d, but now without U-turns. Mutual angles between the tangentials 3224 are indicated with θ.

Note that in the embodiment schematically depicted in FIG. 3f and similar embodiments, the second layer part is not terminated at a termination position, whereas in the embodiment schematically depicted in FIG. 3g (see also FIG. 3e or FIG. 3c, etc.), the second layer part is terminated at a termination position.

Figure 3H:
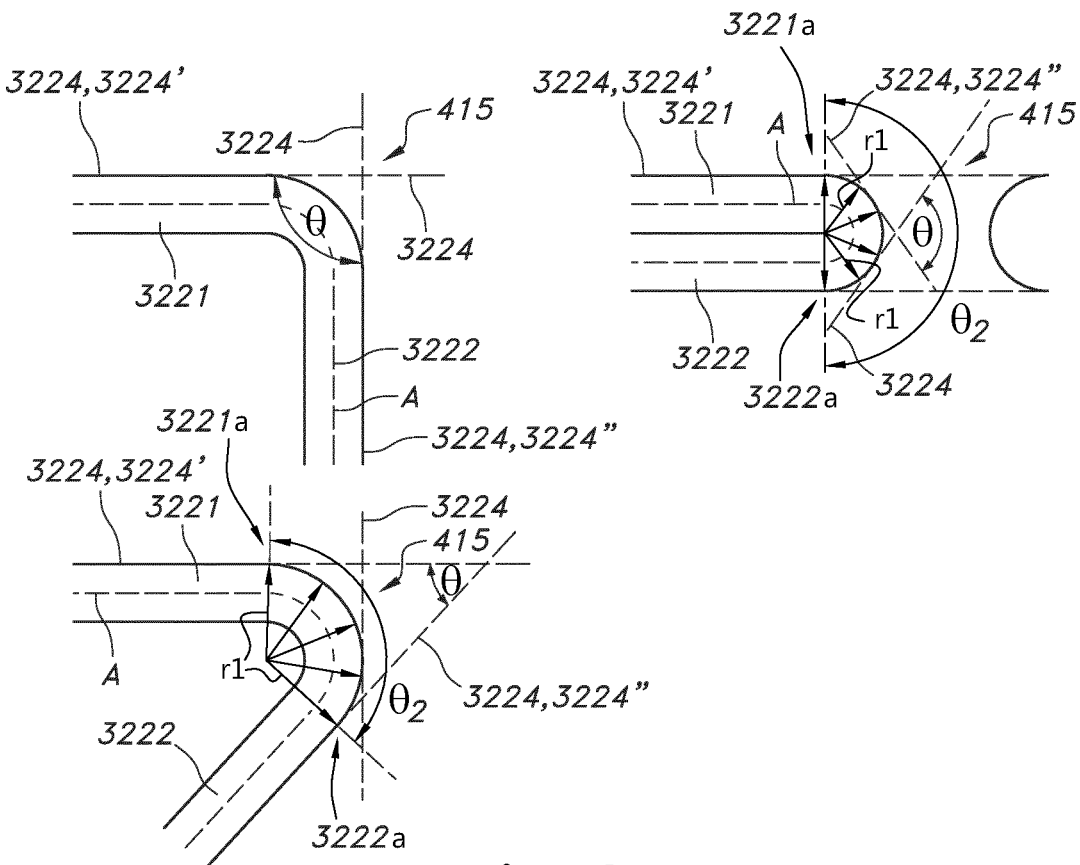

FIG. 3h schematically depicts some embodiments of possible turns 415, including the tangentials θ. Here, 3224' refers to a tangential associated with the first layer part 3221, and 3224" refers to a tangential associated with the second layer part 3222.

The angle θ2 indicates an angle of the path length of the turn 415 which starts at 3221a or 3222a and ends at 3222a or 3221a. reference r1 indicates the radius of the path length or arc. In case of the U-turn (right Figure on top), the arc angle θ2 is about 180°. Note that the (mutual) angle of the first layer part 3221 and the second layer part 3222 is essentially 0°.

Figure 3I:
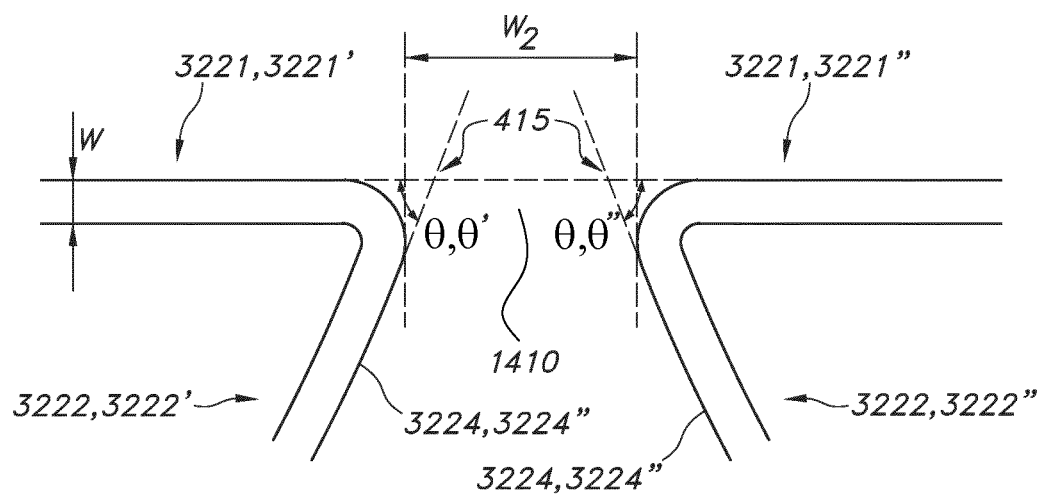

FIG. 3i schematically depicts an embodiment of an opening, defined by turns 415 with associated first layer part 3221 and second layer part 3222. Here, like in the other schematically depicted embodiments, the turns have essentially the same shapes (and thus the same (respective) θ).

Figure 3J:
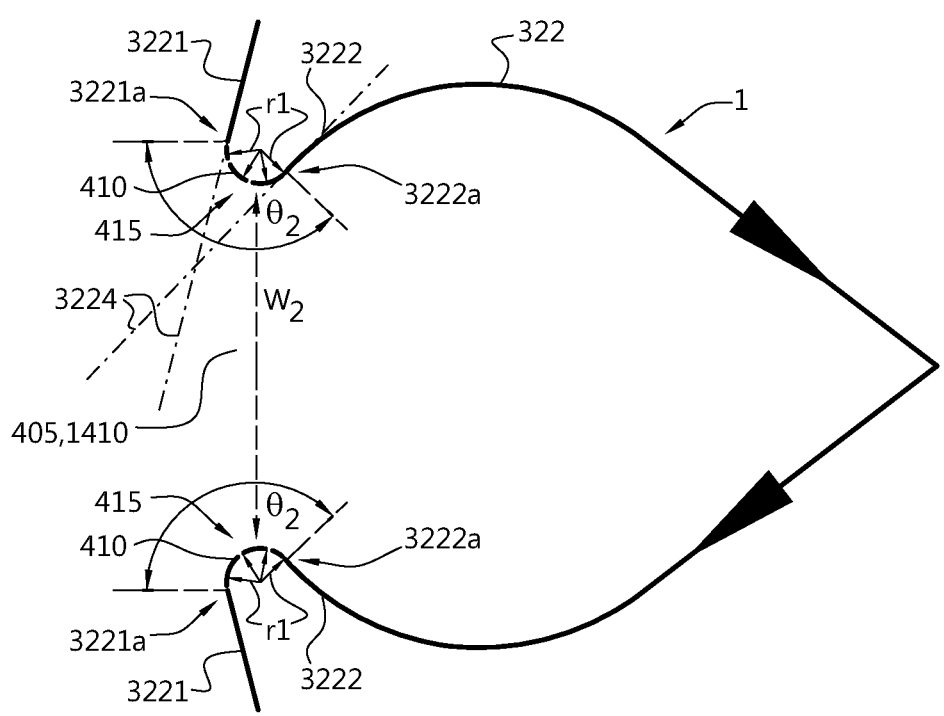

FIG. 3j schematically depicts an embodiment of a 3D item 1, or more especially a part thereof (see e.g. also FIG. 3f). Especially, a cross-section of part of the 3D item is shown, parallel to the layers.

The layer 322 of which a cross-section is shown comprises an opening 405 in the 3D printed material. The opening 405 has an opening edge 410 that is at least partly defined by the interruption 1410 in the layers. As schematically depicted, the interruption 1410 is defined by oppositely arranged turns 415. Each turn 415 connects a first layer part 3221 and a second layer part 3222. Further, each turn 415 has a path length Lr with a radius of curvature r1. The path length Lr is at least $0.5*\pi*r1$. As indicated above, instead of the term "path length", also the term arc may be used. The path length may be between the parts indicated with references 3221a and 3222a. At those positions, the radius changes and the turn 415 ends or begins. Between those positions, the radius r1 may essentially be constant. In a direction against the arrows: note that the radius of the first part 3221 up to the position 3221a is nearly ∞, whereas at position 3221a it changes to r1, up to position 3222a, where the radius changes, but to a rather large value, to change further to essentially ∞ until the sharp angle at the right of the drawing.

The angle θ2 indicates the angle of the arc of the turn 415, which is here about 135° for the lower turn 415. Note that the turns 415, the angels θ2 and the radii r1 are not necessarily the same for those turns 415 that define the opening 405.

The first layer parts 3221 of both turns 415 here depicted may define at least part of the item contour of the 3D item 1.

Referring to e.g. FIGS. 3*a*, 3*b*, 3*c*, 3*f* and 3*j*, one or more layers may define an external item side part (see e.g. FIG. 3*a*) and an internal item side part of the 3D item. Especially, the first layer part(s) 3221 may define the external item side part (see e.g. also FIGS. 3*f* and 3*j*). Further, especially the second layer part(s) (3222) are configured at the internal item side part 12 (see e.g. also FIGS. 3*f* and 3*j*, and also e.g. FIG. 3*c*).

As indicated above, the invention also provides a device 100 comprising the 3D item 1 as defined herein.

Figure 4A:
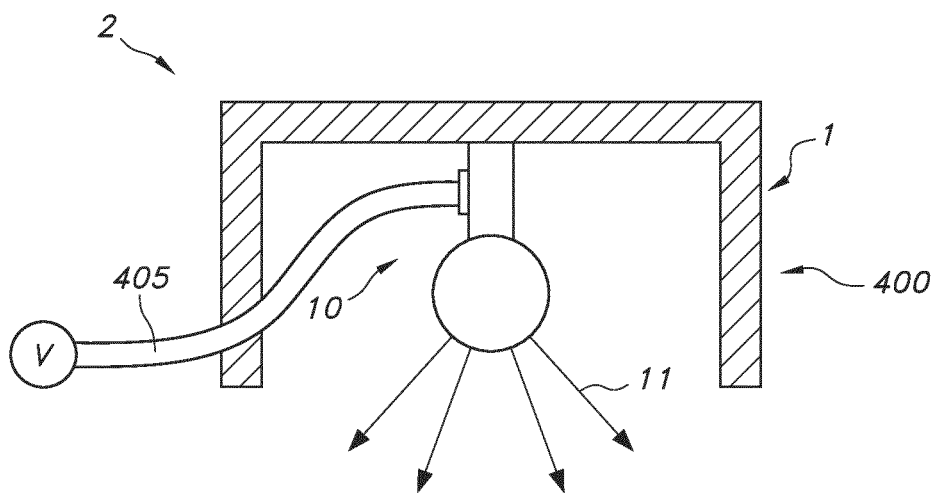
FIGS. 4a-4b schematically depict embodiments of applications.

FIG. 4*a* schematically depicts an embodiment of the device 100, wherein the device 100 comprises a lighting device 1000, and wherein the 3D item 1 may be configured as one or more of at least part of a lighting device housing, at least part of a wall of a lighting chamber, and an optical element. The device 100, be it a lighting device or not, may further comprising a transport element 120, wherein part of the transport element 120 is enclosed by the opening 405, and wherein the transport element 120 is configured to transport one or more of a gas, liquid, light, and electricity.

Figure 4B:
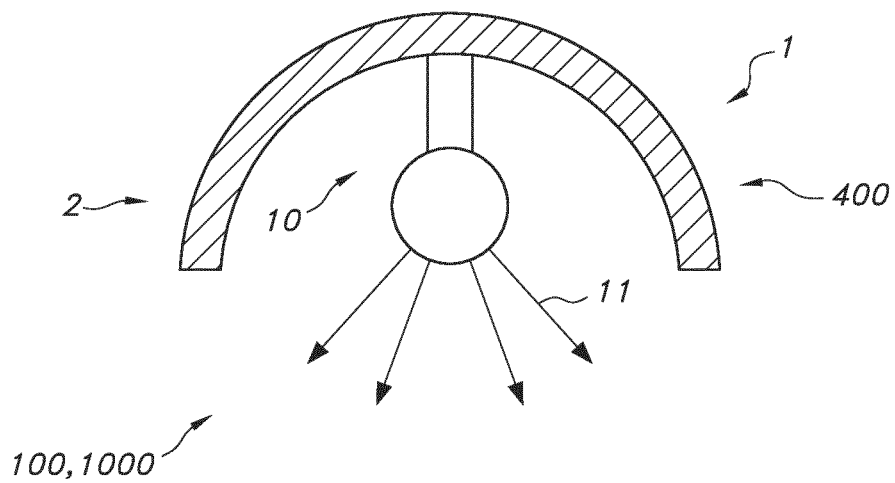

FIG. 4*b* schematically depicts an embodiment of a lamp or luminaire, indicated with reference 2, which comprises a light source 10 for generating light 11. The lamp may comprise a housing or shade or another element, which may comprise or be the 3D printed item 1. Here, the half sphere (in cross-sectional view) schematically indicates a housing or shade. The lamp or luminaire may be or may comprise a lighting device 1000 (which comprises the light source 10). Hence, in specific embodiments the lighting device 1000 comprises the 3D item 1. The 3D item 1 may be configured as one or more of (i) at least part of a lighting device housing, (ii) at least part of a wall of a lighting chamber, and (iii) an optical element. Hence, the 3D item may in embodiments be reflective for light source light 11 and/or transmissive for light source light 11. Here, the 3D item may e.g. be a housing or shade. The housing or shade comprises the item part 400. For possible embodiments of the item part 400, see also above.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention also provides a control system that may control the apparatus or device or system, or that may execute the herein described method or process. Yet further, the invention also provides a computer program product, when running on a computer which is functionally coupled to or comprised by the apparatus or device or system, controls one or more controllable elements of such apparatus or device or system.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A lighting device comprising a 3D item that is configured as one or more of (i) at least part of a lighting device housing, (ii) at least part of a wall of a lighting chamber, and (iii) an optical element, wherein the 3D item comprises a plurality of layers of 3D printed material, and an opening in the 3D printed material, the opening having an opening edge that is at least partly defined by one or more interruptions in a subset of one or more layers of the plurality of layers, wherein each interruption is defined by oppositely arranged turns, wherein each turn connects a second layer part, along its length, to a first layer part, wherein each turn has a path length (Lr) with a radius of curvature (r1), and wherein each path length (Lr) is selected from the range of $0.9*\pi*r1 \leq Lr \leq \pi*r1$, wherein the layer parts form legs of the turns, wherein the turns comprise U-turns, which layer parts are configured adjacent, wherein for the U-turns applies that a second layer part having a second length (L2) is shorter than a first layer part having a first length (L1) such that over only part of the layer, the layer parts are configured contiguous.

2. The lighting device according to claim 1, wherein the subset of the one or more layers define an external item side part and an internal item side part of the 3D item, wherein the first layer part(s) define the external item side part, and wherein the second layer part(s) are configured at the internal item side part.

3. The lighting device according to claim 1, wherein for the turns applies that a second layer part having a second length (L2) is shorter than a first layer part having a first length (L1), wherein the layers have a layer width (W), wherein the second length (L2) is selected from the range of the shorter of (a) $3*W \leq L2 \leq 20*W$ and (b) $3*W \leq L2 < L1$.

4. The lighting device according to claim 1, further comprising a transport element, wherein part of the transport element is enclosed by the opening, and wherein the transport element is configured to transport one or more of a gas, liquid, light, and electricity.

5. The lighting device according to claim 1, wherein the layers have a layer width (W), and wherein the second length (L2) is selected from the range of $L2 \geq 2*W$.

* * * * *